United States Patent
Ogino et al.

(10) Patent No.: US 12,461,062 B2
(45) Date of Patent: Nov. 4, 2025

(54) ELECTROPHORESIS SYSTEM AND ELECTROPHORESIS ANALYSIS METHOD

(71) Applicant: SHIMADZU CORPORATION, Kyoto (JP)

(72) Inventors: Kota Ogino, Kyoto (JP); Akira Harada, Kyoto (JP); Kazunori Shimizu, Kyoto (JP); Takashi Morimoto, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 431 days.

(21) Appl. No.: 17/994,507

(22) Filed: Nov. 28, 2022

(65) Prior Publication Data

US 2023/0176008 A1 Jun. 8, 2023

(30) Foreign Application Priority Data

Dec. 3, 2021 (JP) .................................. 2021-197212

(51) Int. Cl.
*G01N 27/447* (2006.01)
*G01N 27/453* (2006.01)

(52) U.S. Cl.
CPC ... *G01N 27/4473* (2013.01); *G01N 27/44782* (2013.01)

(58) Field of Classification Search
CPC ......... G01N 27/4473; G01N 27/44782; G01N 27/44704; G01N 27/44791
See application file for complete search history.

(56) References Cited

U.S. PATENT DOCUMENTS

| | | | | | |
|---|---|---|---|---|---|
| 4,810,348 | A | * | 3/1989 | Sarrine | G01N 27/44721 204/612 |
| 5,055,172 | A | * | 10/1991 | Cathel | G01N 27/44721 204/608 |
| 5,624,539 | A | * | 4/1997 | Ewing | G01N 27/44752 204/600 |
| 5,963,456 | A | * | 10/1999 | Klein | G01N 27/44721 345/589 |

(Continued)

FOREIGN PATENT DOCUMENTS

| | | | | | |
|---|---|---|---|---|---|
| JP | 60-119457 | A | * | 6/1985 | ............. G01N 27/26 |
| JP | 60252250 | A | * | 12/1985 | ............. G01N 27/26 |

(Continued)

OTHER PUBLICATIONS

JPO machine-generated translation of Akiyama Junichi JP 60-119457 A, patent published Jun. 26, 1985 (Year: 1985).*

(Continued)

*Primary Examiner* — Alexander S Noguerola
(74) *Attorney, Agent, or Firm* — Sughrue Mion, PLLC

(57) ABSTRACT

An electrophoresis system includes an electrophoresis device including a measurement unit that measures a measurement target separated by electrophoresis, and a current detection unit that detects a current flowing through the flow path. Moreover, the electrophoresis system is configured to display each of a time-series value of a measurement value of the measurement target measured by the measurement unit and a time-series value of a current detection value of the current detected by the current detection unit on a display unit during measurement of the measurement target.

11 Claims, 7 Drawing Sheets

(56) References Cited

U.S. PATENT DOCUMENTS

| | | | | |
|---|---|---|---|---|
| 7,161,356 | B1 * | 1/2007 | Chien | B01L 3/5027 |
| | | | | 204/603 |
| 7,678,254 | B2 * | 3/2010 | Hanafusa | G01N 27/44743 |
| | | | | 204/453 |
| 2004/0018638 | A1 * | 1/2004 | Shoji | G01N 27/44713 |
| | | | | 436/516 |
| 2007/0104615 | A1 | 5/2007 | Hanafusa et al. | |
| 2020/0103372 | A1 | 4/2020 | Asogawa | |
| 2021/0231608 | A1 | 7/2021 | Kumagai et al. | |

FOREIGN PATENT DOCUMENTS

| | | |
|---|---|---|
| JP | 2007-107918 A | 4/2007 |
| JP | 2008-96155 A | 4/2008 |
| JP | 2018-004557 A | 1/2018 |
| JP | 2021-117180 A | 8/2021 |
| WO | 2018/181432 A1 | 10/2018 |

OTHER PUBLICATIONS

JPO machine-generated translation of Kobayashi Shoichi JP 60252250 A, patent published Dec. 12, 1985 (Year: 1985).*
Communication issued May 7, 2025 in Japanese Application No. 2021-197212.

* cited by examiner

ELECTROPHORESIS SYSTEM AND ELECTROPHORESIS ANALYSIS METHOD

CROSS-REFERENCE TO RELATED APPLICATIONS

The related application number JP2021-197212, an electrophoresis system and an electrophoresis analysis method, Dec. 3, 2021, Kota Ogino, Akira Harada, Kazunori Shimizu, and, Takashi Morimoto upon which this patent application is based are hereby incorporated by reference.

BACKGROUND OF THE INVENTION

Field of the Invention

The present invention relates to an electrophoresis system that performs electrophoresis and an electrophoresis analysis method.

Background Art

In the related art, an electrophoresis system that performs electrophoresis is known. Such a system is disclosed, for example, in PCT International Publication No. WO2018/181432.

The electrophoresis system disclosed in PCT International Publication No. WO2018/181432 includes an electrophoresis device and an electrophoresis analysis device. In the electrophoresis device of this electrophoresis system, in a capillary, which is a flow path through which a sample, which is a measurement target, flows for the electrophoresis, a direct current voltage is applied to electrodes inserted in reservoirs provided at both ends of the capillary. Moreover, in a case in which the direct current voltage is applied to the electrodes and the electrophoresis is started, the sample is moved by the electrophoresis. Moreover, the capillary is monitored through a detection window, and actual waveform data showing a temporal change in the fluorescence brightness from the moving sample is created and output to the electrophoresis analysis device.

Here, although it is not disclosed in PCT International Publication No. WO2018/181432, in a case in which an abnormality occurs during the measurement by the electrophoresis, the measurement accuracy is insufficient and the abnormality occurs in a measurement result. Therefore, an operator who performs the measurement needs to confirm a part considered to be the cause of the abnormality of a measurement value one by one in a case in which the abnormality occurs in the measurement result (measurement value) of the measurement by electrophoresis. Therefore, in a case in which the abnormality occurs in the measured measurement value, the confirmation work for determining the cause of the abnormality is a burden on the operator.

SUMMARY OF THE INVENTION

The present invention has been made to solve the above-mentioned problems, and one object of the present invention is to provide an electrophoresis system and an electrophoresis analysis method capable of reducing a workload of an operator to determine a cause of an abnormality in a case in which the abnormality occurs in a measurement value measured by electrophoresis.

In order to achieve the above object, a first aspect of the present invention relates to an electrophoresis system including an electrophoresis device including a measurement unit that measures a measurement target separated by electrophoresis in a flow path including a separation flow path for separating the measurement target, and a current detection unit that detects a current flowing through the flow path, in which the electrophoresis system is configured to display each of a time-series value of a measurement value of the measurement target measured by the measurement unit and a time-series value of a current detection value of the current detected by the current detection unit on a display unit during measurement of the measurement target.

A second aspect of the present invention relates to an electrophoresis analysis method including a step of acquiring a measurement value obtained by measuring a measurement target separated by electrophoresis in a flow path including a separation flow path for separating the measurement target, a step of acquiring a current detection value of a current flowing through the flow path, and a step of displaying each of a time-series value of the measurement value and a time-series value of the current detection value on a display unit during measurement of the measurement target.

In the electrophoresis system in the first aspect and the electrophoresis analysis method in the second aspect, each of the time-series value of the measurement value and the time-series value of the current detection value is displayed on the display unit during the measurement of the measurement target. Here, in a case in which an abnormality also occurs in the current when an abnormality occurs in the measurement value, the probability of an abnormality, such as the concentration of the measurement target itself, an abnormality in a power supply part for passing the current, an abnormality in a process of filling the flow path with a separation buffer, or the like is considered. On the other hand, in a case in which the abnormality does not occur in the current when the abnormality occurs in the measurement value, the probability of deterioration of the member on which the flow path is formed. Therefore, as described above, each of the time-series value of the measurement value and the time-series value of the current detection value is displayed on the display unit during the measurement of the measurement target, so that it is possible to confirm whether or not the abnormality occurs in each of the measurement value and the current by visually recognizing the display unit. Therefore, in a case in which the abnormality occurs in the measurement value, it is possible to confirm whether or not the abnormality occurs in the current, so that the cause of the abnormality of the measurement value can be narrowed down from the probability of the abnormality, such as the concentration of the measurement target itself, the abnormality in the power supply part for passing the current, the abnormality in a process of filling the flow path with the separation buffer, or the like, and the probability of deterioration of the member on which the flow path is formed. As a result, in a case in which the abnormality occurs in the measurement value measured by the electrophoresis, it is possible to reduce the workload of the operator for determining the cause of the abnormality.

DETAILED DESCRIPTION OF THE INVENTION

In the following, an embodiment embodying the present invention will be described with reference to the drawings.
Overall Configuration of Electrophoresis System An electrophoresis system 100 according to the embodiment of the present invention will be described with reference to FIGS. 1 to 8.

Figure 1:
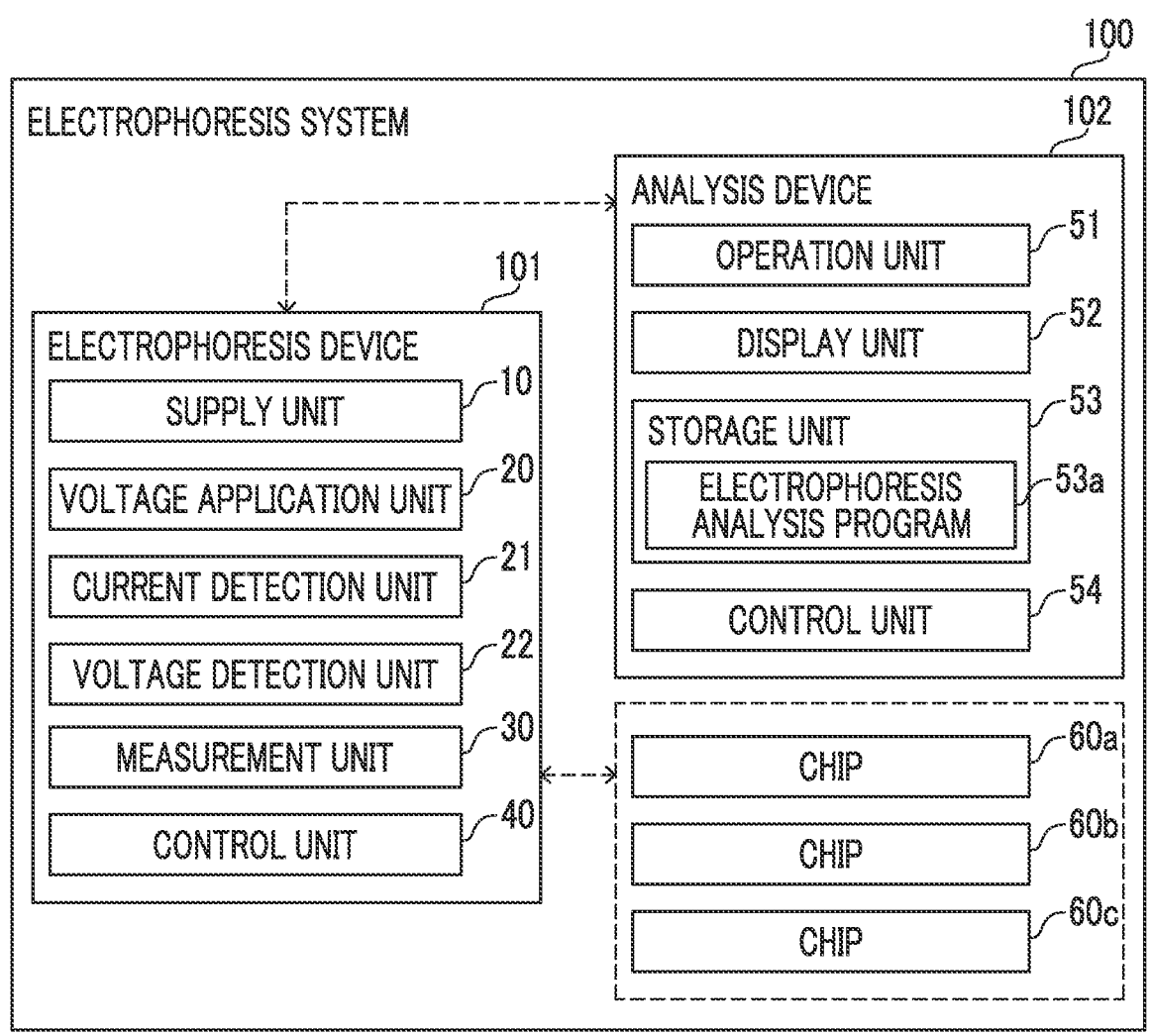
FIG. 1 is a block diagram showing an overall configuration of an electrophoresis system according to the present embodiment.

As shown in FIG. 1, the electrophoresis system 100 according to the present embodiment includes an electrophoresis device 101 and an analysis device 102.

Figure 2:
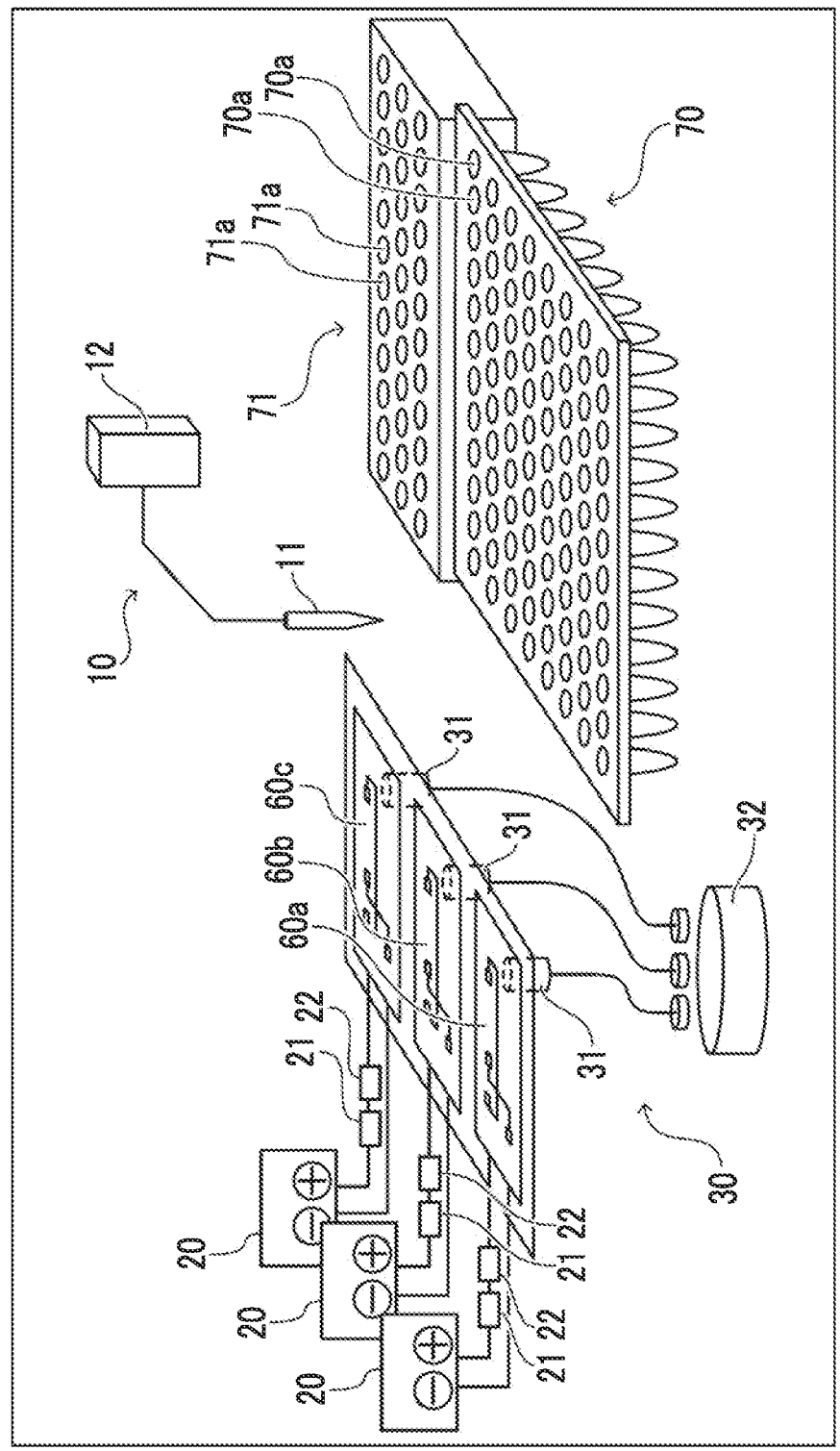
FIG. 2 is a schematic diagram for describing a configuration of an electrophoresis device according to the present embodiment.

The electrophoresis device 101 measures (analyzes) components included in a measurement target by separating the measurement target by electrophoresis using three chips 60a, 60b, and 60c. Specifically, in the electrophoresis device 101, the measurement targets previously disposed in a plate 70 and a sample disposition portion 71 (see FIG. 2) are separated by the electrophoresis in a flow path 62 (see FIG. 3) provided in each of the chips 60a to 60c. Moreover, the electrophoresis device 101 measures a degree of separation (degree of movement) of the measurement target separated by the electrophoresis. It should be noted that the chips 60a to 60c are examples of a "flow path member" in the scope of claims.
Configuration of Electrophoresis Device As shown in FIGS. 1 and 2, the electrophoresis device 101 includes a supply unit 10, a voltage application unit 20, a measurement unit 30, and a control unit 40.

In the electrophoresis device 101, the measurement target and the separation buffer are supplied to the flow path 61 of each of the chips 60a, 60b, and 60c for the measurement by the electrophoresis by an operation by the supply unit 10.

The measurement target includes, for example, deoxyribonucleic acid (DNA), ribonucleic acid (RNA), and protein. The measurement target includes a sample for measuring the degree of separation (degree of movement) of each component by the electrophoresis and a standard sample as a standard for the measurement by the electrophoresis of the sample. The sample is a measurement target of which the degree of separation (measurement waveform) by the electrophoresis, which is a measurement value 111 (see FIG. 4) measured by the measurement unit 30 described later, is unknown. In addition, the standard sample is a measurement target including nucleic acid or protein of which separation characteristics, such as molecular weight (chain length), have already been known.

In addition, the measurement target is disposed in the plate 70 and the sample disposition portion 71. The plate 70 is provided with a plurality of wells 70a, which are a plurality of disposition positions at which the measurement targets are disposed. For example, the plate 70 is provided with 8×12, that is, 96 wells 70a. The plate 70 is disposed by an operator at a plate disposition position inside the electrophoresis device 101 in a state in which a plurality of types of measurement targets are disposed in all or a part of each of the plurality of wells 70a. Moreover, the sample disposition portion 71 disposes the measurement target separately from the plate 70. In addition, the sample disposition portion 71 includes a plurality of disposition positions at which the measurement targets are disposed, and the plurality of disposition positions of the sample disposition portion 71 are set as wells 71a. For example, the measurement target of which the measurement value 111 is unknown and to be analyzed is disposed in the well 70a of the plate 70, and the standard sample of which the measurement value 111 is known is disposed in the well 71a of the sample disposition portion 71 separately from the plate 70.

The separation buffer is a separation medium that is filled into the flow path 61 (see FIG. 3) of each of the chips 60a, 60b, and 60c before the measurement target is supplied. The separation buffer includes, for example, at least one of a pH buffer material and a water-soluble polymer (a cellulosic polymer or the like). In addition, a buffer container (not shown) is filled with the separation buffer. It should be noted that the separation buffer may be disposed in the plate 70 or the sample disposition portion 71. In the electrophoresis device 101, the measurement target is supplied and the electrophoresis is performed in a state in which the inside of the flow path 61 is filled with the separation buffer in advance.

As shown in FIG. 2, the supply unit 10 includes a probe 11 and a pump 12. By moving the probe 11, the supply unit 10 supplies the separation buffer and the measurement target (sample and standard sample) disposed on the plate 70 or the sample disposition portion 71 to the chips 60a to 60c. The pump 12 adjusts a pressure for sucking and discharging the separation buffer and the measurement target in the probe 11.

Figure 3:
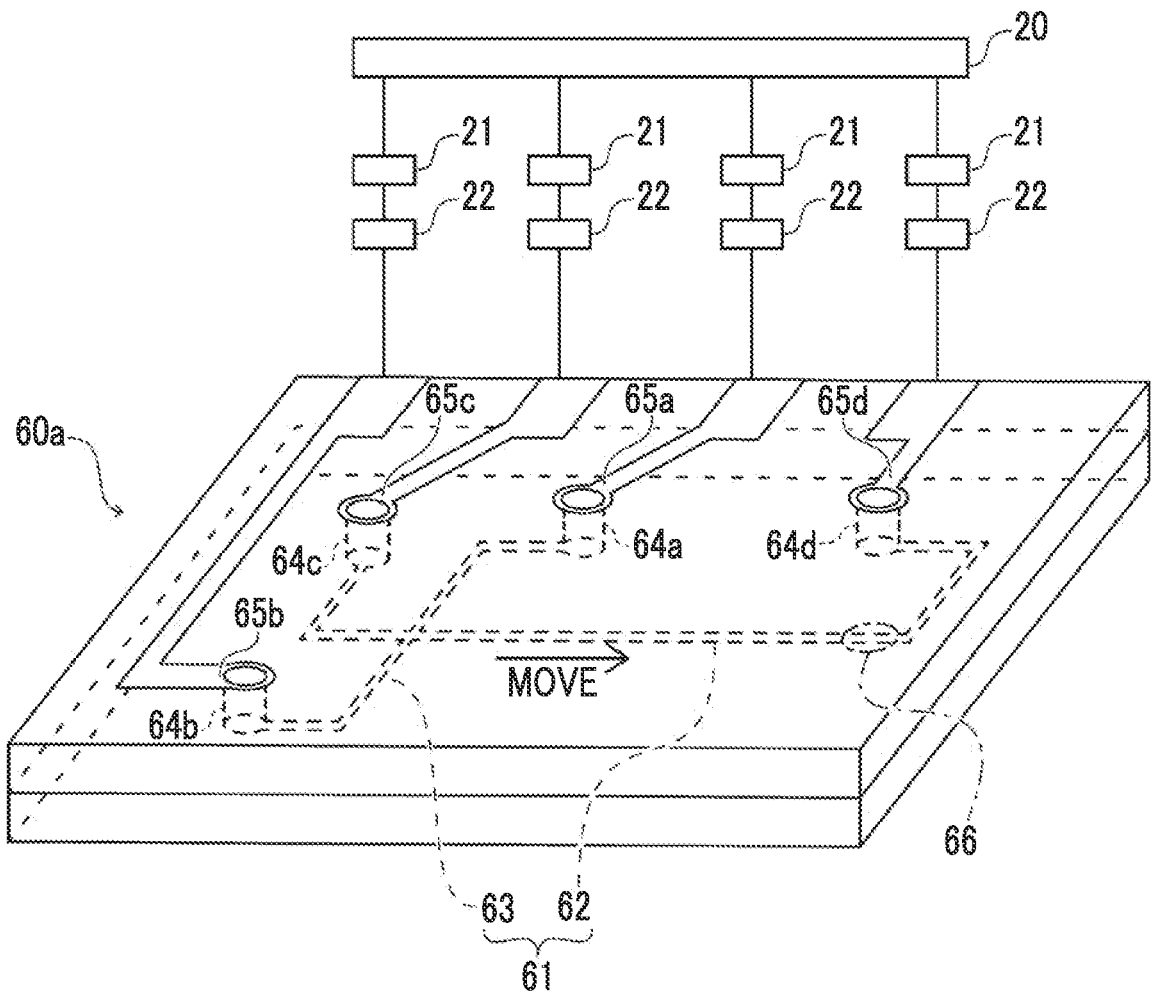
FIG. 3 is a diagram for describing a configuration of a chip in which a flow path for electrophoresis is provided.

As shown in FIG. 3, each of the chips 60a to 60c is provided with the flow path 61 inside. Here, the chips 60a, 60b, and 60c have the same configuration as each other. In the following description, the details of the chip 60a will be shown and described, and the description of the chips 60b and 60c will be omitted because the description is the same as that of the chip 60a.

The chip 60a is a microchip for the electrophoresis in which the flow path 61 for performing the electrophoresis is provided inside a pair of combined members having a plate shape. The flow path 61 includes a separation flow path 62 and a preparation flow path 63. The separation flow path 62 and the preparation flow path 63 are provided to intersect each other. The separation flow path 62 is provided for separating the measurement target by the electrophoresis. In addition, the preparation flow path 63 is provided for guiding the measurement target to the separation flow path 62.

In addition, reservoir portions 64a and 64b, which is a space for supplying and sucking the separation buffer and the measurement target, are provided at both ends of the preparation flow path 63. Similarly, reservoir portions 64c and 64d are provided at both ends of the separation flow path 62. Moreover, a plurality of electrodes 65a, 65b, 65c, and 65d are disposed in the flow path 61. Specifically, the electrodes 65a and 65b are disposed in the reservoir portions 64a and 64b provided at both ends of the preparation flow path 63, respectively. Moreover, the electrodes 65c and 65d are disposed in the reservoir portions 64c and 64d provided at both ends of the separation flow path 62, respectively.

In the electrophoresis device 101, the electrophoresis is performed by applying the voltage from the voltage application unit 20 to the plurality of electrodes 65a to 65d provided in the flow path 61. In addition, the magnitude of the voltage applied to the electrodes 65a to 65d is controlled by the control unit 40. It should be noted that three voltage application units 20 (see FIG. 2) are provided to correspond to the chips 60a to 60c, respectively, for applying a direct current voltage to the flow path 61 of each of the chips 60a to 60c. That is, the direct current voltage is applied to the flow path 61 by the voltage application unit 20 also for the chip 60b and the chip 60c, similarly to the chip 60a.

In the electrophoresis device 101, in a case in which the chip 60a is used for the measurement by the electrophoresis, first, the supply unit 10 fills the entire inside of the flow path 61 (separation flow path 62 and preparation flow path 63) with the separation buffer. Moreover, for example, the measurement target sucked from a predetermined well 70a of the plate 70 is supplied to the reservoir portion 64a of the preparation flow path 63 by the supply unit 10. Moreover, in a case in which a predetermined voltage is applied to the electrodes 65a to 65d by the voltage application unit 20, the measurement target is moved inside the preparation flow path 63, and is moved to a position at which the preparation flow path 63 and the separation flow path 62 intersect each other. Thereafter, the magnitude of the voltage applied to each of the electrodes 65a to 65d from the voltage application unit 20 is changed, so that the measurement target is moved toward the electrode 65d (reservoir unit 64d) while being separated by the electrophoresis in the inside of the separation flow path 62.

In this case, in the separation measurement by the electrophoresis, the measurement target is moved inside the separation flow path 62 at a different speed for each component included in the measurement target due to the separation characteristics, such as the molecular weight (chain length), of the included components. In the electrophoresis device 101, the separation characteristics of each component, which is the measurement target, are measured by measuring the components arriving in order at a measurement position 66 in the separation flow path 62. In this way, in the electrophoresis device 101, the components included in the measurement target are measured for each degree of separation (degree of migration).

As shown in FIG. 2, in the present embodiment, the measurement unit 30 measures the measurement target separated by the electrophoresis in the flow path 61 of each of a plurality of (three) chips 60a to 60c. For example, the measurement unit 30 fluorescently detects the component, which is the measurement target, separated by the electrophoresis. The measurement unit 30 includes a light emitting diode (LED) 31 that irradiates the measurement position 66 (see FIG. 3) of the separation flow path 62 with excitation light. Moreover, the excitation light from the LED 31 is applied to each component of the measurement target that is moved in the separation flow path 62 while being separated by the electrophoresis, so that each component of the measurement target is excited and emits fluorescence. The measurement unit 30 measures the degree of separation of the measurement target by the electrophoresis by measuring the fluorescence with a photomultiplier tube 32, for example, via an optical fiber and a filter member.

Figure 4:
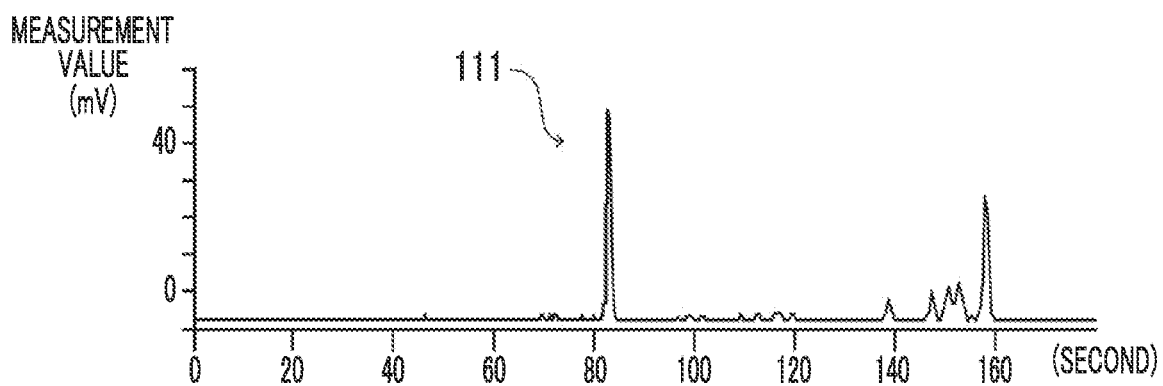
FIG. 4 is a diagram showing an example of a measurement value acquired by the measurement of a measurement unit.

As shown in FIG. 4, the photomultiplier tube 32 outputs a measurement signal indicating the measurement value 111 to the control unit 40 in accordance with the detected fluorescence intensity. The measurement value 111 based on the measurement by the measurement unit 30 shows a large value (peak) at a timing when the measurement target, which is moved while being separated by the electrophoresis, passes through the measurement position 66 (see FIG. 3). As a result, an amount and a composition of each component included in the measurement target are analyzed based on the magnitude and the position (timing) of the peak for each component included in the measurement target.

It should be noted that the electrophoresis device 101 is provided with a cleaning mechanism (not shown). The electrophoresis device 101 is configured to repeatedly perform a plurality of times of the measurement using each of the chips 60a to 60c by cleaning the measurement target and the separation buffer remaining in the flow path 61 at each part including the chips 60a to 60c, and the supply unit 10 by the cleaning mechanism each time the measurement of one measurement target is performed.

In addition, as shown in FIGS. 2 and 3, the electrophoresis device 101 includes a current detection unit 21 and a voltage detection unit 22. The current detection unit 21 and the voltage detection unit 22 detect a current and a voltage output from each of the plurality of (three) voltage application units 20, respectively. The current detection unit 21 detects the current flowing through the flow path 61 of each of the chips 60a to 60c by the voltage applied by the voltage application unit 20. In addition, the voltage detection unit 22 detects the voltage applied to the flow path 61 of each of the chips 60a to 60c by the voltage application unit 20.

For example, in the chip 60a, the current detection unit 21 detects the current flowing through the flow path 61 by detecting the current flowing through each of the electrodes 65a, 65b, 65c, and 65d. Similarly, the voltage detection unit 22 detects the voltage applied to the flow path 61 by detecting the voltage applied to each of the electrodes 65a, 65b, 65c, and 65d. Moreover, the current detection unit 21 and the voltage detection unit 22 output detection signals indicating a current detection value 112 (see FIG. 5) and a voltage detection value 113 (see FIG. 6), which are detected, to the control unit 40, respectively. The same applies to the chip 60b and the chip 60c.

Figure 5:
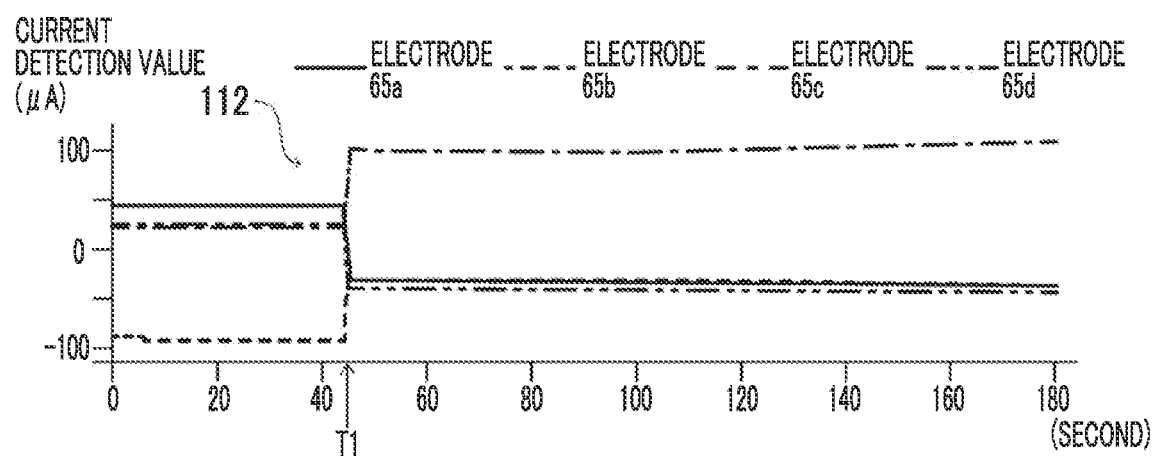
FIG. 5 is a diagram showing an example of a current detection value of a current flowing through the flow path.
Figure 6:
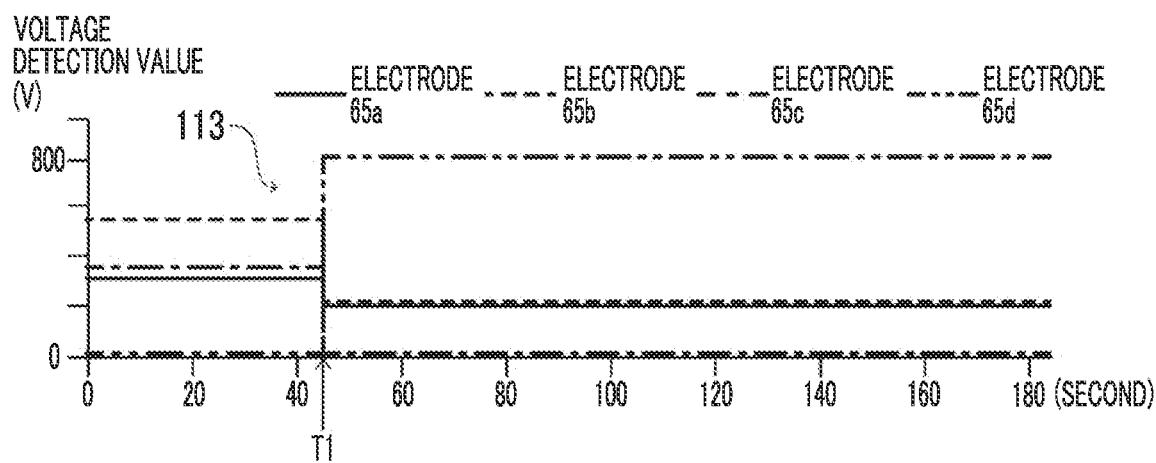
FIG. 6 is a diagram showing an example of a voltage detection value of a voltage applied to the flow path.

Therefore, as shown in FIGS. 5 and 6, the control unit 40 is configured to acquire four current detection values 112 and four voltage detection values 113 to correspond to the four electrodes 65a to 65d for each chip 60a (60b or 60c). It should be noted that, at a point in time T1 shown in FIGS. 5 and 6, the current detection value 112 and the voltage detection value 113 are significantly changed. This means that at the point in time T1, a period during which the measurement target is moved in the preparation flow path 63 is switched to a period during which the measurement target is moved in the separation flow path 62.

The control unit 40 controls the operation of each unit of the electrophoresis device 101. The control unit 40 is, for example, a microcomputer (microcontroller) including a processing device, such as a central processing unit (CPU), and a storage device, such as a flash memory. In addition, the control unit 40 includes a communication module and is configured to communicate with the analysis device 102. Moreover, the control unit 40 controls the operation of each unit of the electrophoresis device 101 to sequentially perform the measurement of the measurement target disposed in the plate 70 and the sample disposition portion 71 by the electrophoresis based on a drive signal from the analysis device 102.

Specifically, the control unit 40 operates the supply unit 10 based on the drive signal from the analysis device 102 to sequentially supply the measurement target disposed in, for example, the well 70a of the plate 70 to perform one type of the measurement for each of the chips 60a to 60c. Moreover, the control unit 40 separates (moves) the measurement target by the electrophoresis by applying the voltage to the flow path 61 of each of the chips 60a to 60c by the voltage application unit 20. In addition, the control unit 40 acquires the measurement value 111 (electropherogram) measured by the measurement unit 30 provided to correspond to each of the chips 60a to 60c. Moreover, the control unit 40 acquires the measurement value 111 for each of the plurality of wells 70a of the plate 70 and for each well 71a of the sample disposition portion 71. In addition, the control unit 40 is configured to acquire the current detection value 112 detected by the current detection unit 21 and the voltage detection value 113 detected by the voltage detection unit 22 in synchronization with the measurement by the measurement unit 30.

Moreover, for each of the chips 60a to 60c, the control unit 40 outputs, in real time, the measurement value 111 of the measurement target measured by the measurement unit 30, the current detection value 112 of the current detected by the current detection unit 21, and the voltage detection value 113 of the voltage detected by the voltage detection unit 22 to the analysis device 102 from a period during which the measurement target is introduced (electrophoresed) in the preparation flow path 63 to a period during which the measurement target is measured in the separation flow path 62.

Configuration of Analysis Device

As shown in FIG. 1, the analysis device 102 includes an operation unit 51, a display unit 52, a storage unit 53, and a control unit 54. The analysis device 102 is a computer for analyzing the measurement value 111 measured by the electrophoresis device 101. The analysis device 102 is configured to communicate with the electrophoresis device 101, and is configured to acquire each of the measurement value 111, the current detection value 112, and the voltage detection value 113 acquired by the electrophoresis device 101.

The operation unit 51 receives an input operation by the operator. In addition, the operation unit 51 outputs an operation signal based on the received input operation to the control unit 54. For example, the operation unit 51 is a pointing device, such as a keyboard and a mouse.

For example, the display unit 52 is a monitor, such as a liquid crystal display. Moreover, the display unit 52 displays information input under the control of the control unit 54.

The storage unit 53 is composed of a hard disk drive or a storage device, such as a solid state drive (SSD). The storage unit 53 stores the measurement value 111, the current detection value 112, and the voltage detection value 113 acquired by the electrophoresis device 101. In addition, the storage unit 53 stores an electrophoresis analysis program 53a for operating the control unit 54. In addition, the storage unit 53 stores various parameters, such as preset set values or set values (measurement conditions) input by the operator.

The control unit 54 is a computer including a CPU, a random access memory (RAM), a read only memory (ROM), and the like. The control unit 54 controls each unit of the analysis device 102 by executing the program (electrophoresis analysis program 53a) stored in the storage unit 53. In addition, the control unit 54 is configured to communicate with the control unit 40 of the electrophoresis device 101 via a communication module (not shown).

Details of Control by Analysis Device

The control unit 54 transmits an operation signal for operating the electrophoresis device 101 to the control unit 40. Specifically, the control unit 54 acquires various parameters for performing the electrophoresis based on the input operation received by the operation unit 51. For example, based on the input operation with respect to the operation unit 51, the control unit 54 acquires well information 52b (see FIG. 8) indicating the wells 70a and 71a in which the measurement targets to be measured are disposed, measurement condition information including information indicating the magnitude and the time of the applied voltage, schedule information 52c (see FIG. 8) indicating measurement orders of the measurement targets disposed in the plurality of wells 70a and 71a, and the like. It should be noted that the well information 52b, the measurement condition information, and the schedule information 52c may be selected from databases stored in the storage unit 53 in advance. Moreover, the control unit 54 transmits the drive signal including the acquired well information 52b, measurement condition information, schedule information 52c, and the like to the control unit 40 of the electrophoresis device 101. Moreover, the control unit 54 acquires each of the measurement value 111, the current detection value 112, and the voltage detection value 113 acquired by the control by the control unit 40 based on the transmitted drive signal from the control unit 40 in real time with respect to the progress of measurement.

Figure 7:
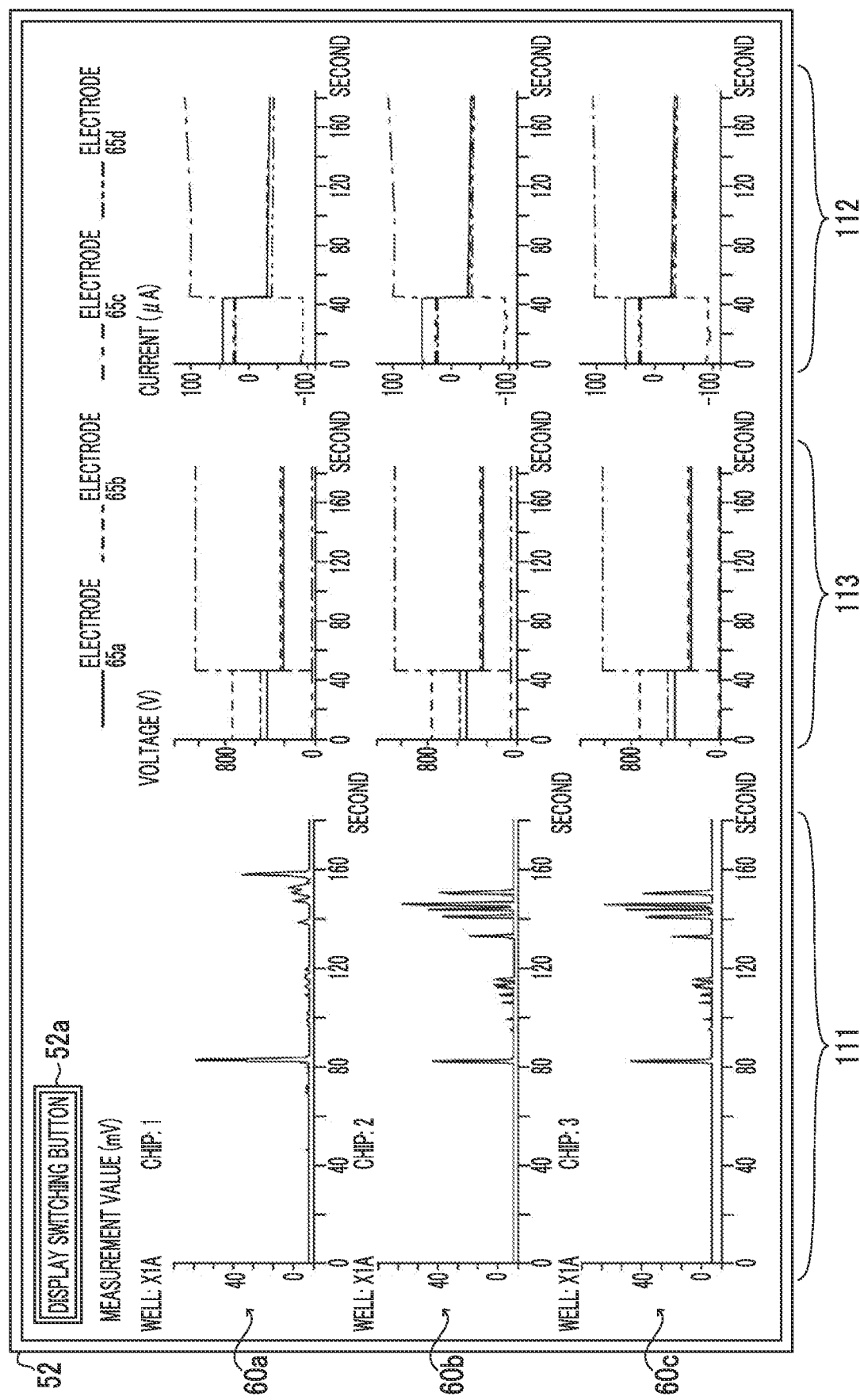
FIG. 7 is a diagram showing an example of the display of a display unit during the measurement.

Moreover, as shown in FIG. 7, in the present embodiment, the control unit 54 is configured to display the measurement value 111, the current detection value 112, and the voltage detection value 113 on the display unit 52. Specifically, the control unit 54 is configured to display a time-series value of the measurement value 111, time-series values of four current detection values 112 corresponding to the currents flowing through the plurality of electrodes 65a to 65d, respectively, and time-series values of four voltage detection values 113 corresponding to the voltages applied to the plurality of electrodes 65a to 65d, respectively, on the display unit 52 during the measurement of the measurement target.

Specifically, the control unit 54 displays the time-series value of each of the measurement value 111, the current detection value 112, and the voltage detection value 113 on the display unit 52 while updating the time-series value of each of the measurement value 111, the current detection value 112, and the voltage detection value 113 in real time during the measurement of the measurement target. It should be noted that the control unit 54 is configured to display the time-series value of each of the measurement value 111, the current detection value 112, and the voltage detection value 113 on the display unit 52 during introduction of the measurement target into the preparation flow path 63, in addition to during the measurement of the measurement target (while the measurement target is moved to the separation flow path 62 and measured by the measurement unit 30). In addition, the control unit 54 is configured to display the time-series value of each of the measurement value 111, the current detection value 112, and the voltage detection value 113 acquired over a common measurement period on the display unit 52 as a waveform.

That is, the control unit 54 is configured to display the time-series value of each of the measurement value 111, the current detection value 112, and the voltage detection value 113 from a point in time when the application of the direct current voltage by the voltage application unit 20 is started to the present after the measurement target is supplied to the reservoir portion 64a in each chip 60a (60b or 60c) on the display unit 52.

In addition, the control unit 54 is configured to superimpose the time-series value (waveform) of each of the four current detection values 112 corresponding to the currents flowing through the plurality of electrodes 65a to 65d, respectively, and the time-series value (waveform) of each of the four voltage detection values 113 corresponding to the voltages applied to the plurality of electrodes 65a to 65d, respectively, and display the superimposed time-series values on the display unit 52 in a distinguishable state by different colors. For example, the control unit 54 shows the time-series values of the current detection value 112 and the voltage detection value 113 corresponding to the electrode 65a as a red waveform. In addition, the control unit 54 shows the time-series values of the current detection value 112 and the voltage detection value 113 corresponding to the electrode 65b as a yellow waveform. Moreover, the control unit 54 shows the time-series values of the current detection value 112 and the voltage detection value 113 corresponding to the electrode 65c as a blue waveform. In addition, the control unit 54 shows the time-series values of the current detection value 112 and the voltage detection value 113 corresponding to the electrode 65d as a green waveform. It should be noted that, in FIG. 7 (and FIG. 8), the red waveform, the yellow waveform, the blue waveform, and the green waveform are shown by a solid line, a dotted line, a one-dot chain line, and a two-dot chain line, respectively.

Moreover, the control unit 54 arranges the waveform showing the time-series value of the measurement value 111, the waveform showing the time-series value of the voltage detection value 113, and the waveform showing the time-series value of the current detection value 112 in this order side by side (left and right) and displays the waveforms on the display unit 52. In addition, the control unit 54 is configured to display the time-series value (waveform) of each of the measurement value 111, the current detection value 112, and the voltage detection value 113 for each of the three chips 60a, 60b, and 60c on the display unit 52.

Specifically, the control unit 54 arranges the chips 60a, 60b, and 60c one above the other in this order by setting a number of the chip 60a to 1, setting a number of the chip 60b to 2, setting a number of the chip 60c to 3, and displays the time-series value (waveform) of each of the measurement value 111, the current detection value 112, and the voltage detection value 113 on the display unit 52. That is, the control unit 54 displays the measurement value 111, the current detection value 112, and the voltage detection value 113 acquired by the measurement in each of the three chips 60a to 60c currently being analyzed in real time. In addition, the control unit 54 displays display indicating the position of the well 70a or 71a corresponding to the measurement target currently being measured in each of the three chips 60a to 60c on the display unit 52.

For example, in the example shown in FIG. 7, the time-series values (waveforms) of the measurement value 111, the current detection value 112, and the voltage detection value 113 acquired while the measurement target disposed in the well 71a at a position X1A (see FIG. 8) of the sample disposition portion 71 is analyzed (measured) in each of the chip 60a of the number 1, the chip 60b of the number 2, and the chip 60c of the number 3 are displayed.

Figure 8:
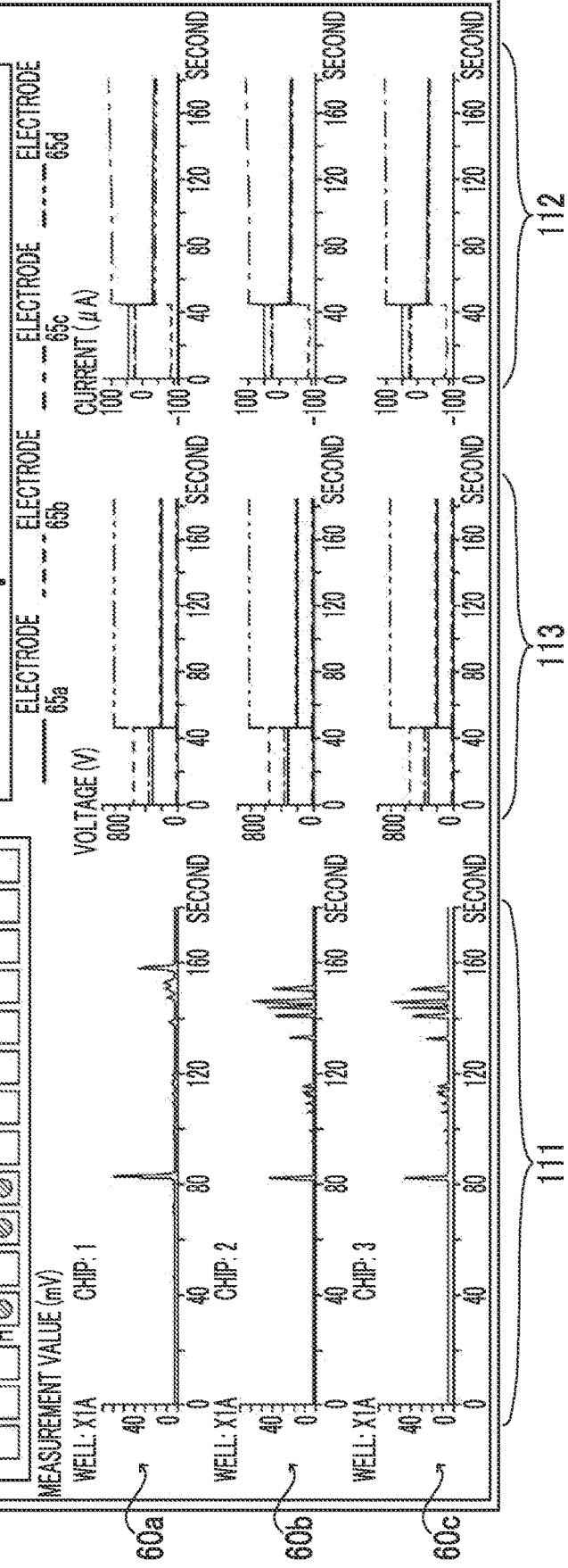
FIG. 8 is a diagram for describing switching of the display of the display unit.

In addition, as shown in FIG. 8, the control unit 54 is configured to display the well information 52b and the schedule information 52c on the display unit 52 in addition to the time-series value of each of the measurement value 111, the current detection value 112, and the voltage detection value 113. In addition, the time-series value of each of the measurement value 111, the current detection value 112, and the voltage detection value 113 is displayed such that a point in time when the application of the voltage by the voltage application unit 20 is started is set as 0 second and an elapsed time up to the present is shown as a horizontal axis.

Moreover, as shown in FIGS. 7 and 8, in the present embodiment, the control unit 54 is configured to, based on a switching operation received by the operation unit 51, switch displaying the time-series value of each of the measurement value 111, the current detection value 112, and the voltage detection value 113 on the display unit 52 and displaying the well information 52b and the schedule information 52c on the display unit 52 in addition to the time-series value of each of the measurement value 111, the current detection value 112, and the voltage detection value 113. Specifically, the control unit 54 is configured to switch the display of the display unit 52 in a case in which the switching operation for switching display is received by a click operation with respect to a display switching button 52a displayed on an upper part of the display unit 52. That is, the control unit 54 is configured to switch the display of the display unit 52 between a state shown in FIG. 7 and a state shown in FIG. 8 based on the switching operation with respect to the operation unit 51.

The well information 52b is displayed at a position on an upper left side of the display unit 52. The well information 52b is information indicating the plurality of wells 70a of the plate 70 and the plurality of wells 71a of the sample disposition portion 71. Specifically, the control unit 54 displays the well information 52b including information indicating which of well 70a or 71a, among the wells 70a of the plate 70 and the wells 71a of the sample disposition portion 71, the measurement target is disposed in, on the display unit 52. Stated another way, the control unit 54 displays the information indicating the wells 70a and 71a in which the analysis (measurement) is performed as the well information 52b. In the well information 52b, the wells 70a and 71a in which the measurement is performed are displayed in a different color (for example, blue) from the wells 70a and 71a in which the measurement is not performed. Which of the measurement targets disposed in the wells 70a and 71a is measured is set based on, for example, the input operation by the operator.

The schedule information 52c is displayed at a position on an upper right side of the display unit 52. The schedule information 52c is information indicating the order in which the measurement is performed by the electrophoresis using the chips 60a to 60c with respect to the measurement target disposed in the plurality of wells 70a and 71a. The control unit 54 arranges the measurement targets in which the measurement is to be performed in the chips 60a to 60c in the measurement order from the top and displays the measurement targets together with the information indicating the disposed wells 70a and 71a while displaying the time-series value (waveform) of each of the measurement value 111, the current detection value 112, and the voltage detection value 113 of the measurement target currently being measured by the chips 60a to 60c on a lower side of the display unit 52.

In addition, in the schedule information 52c, the control unit 54 shows which of the chips 60a to 60c is used to measure the measurement targets disposed in the target wells 70a and 71a by the number (1 to 3) of the chip in addition to the measurement order. In addition, the control unit 54 shows information indicating the types of the measurement targets disposed in the corresponding wells 70a and 71a in the schedule information 52c. As described above, the measurement target includes two types, the standard sample as a standard and the sample of which the degree of separation (waveform of the measurement value 111) is unknown. In the schedule information 52c, the control unit 54 displays the standard sample as a "sample standard" and the sample as a "sample" on the display unit 52 such that the types of the measurement targets are distinguishable.

About Electrophoresis Analysis Method

Figure 9:
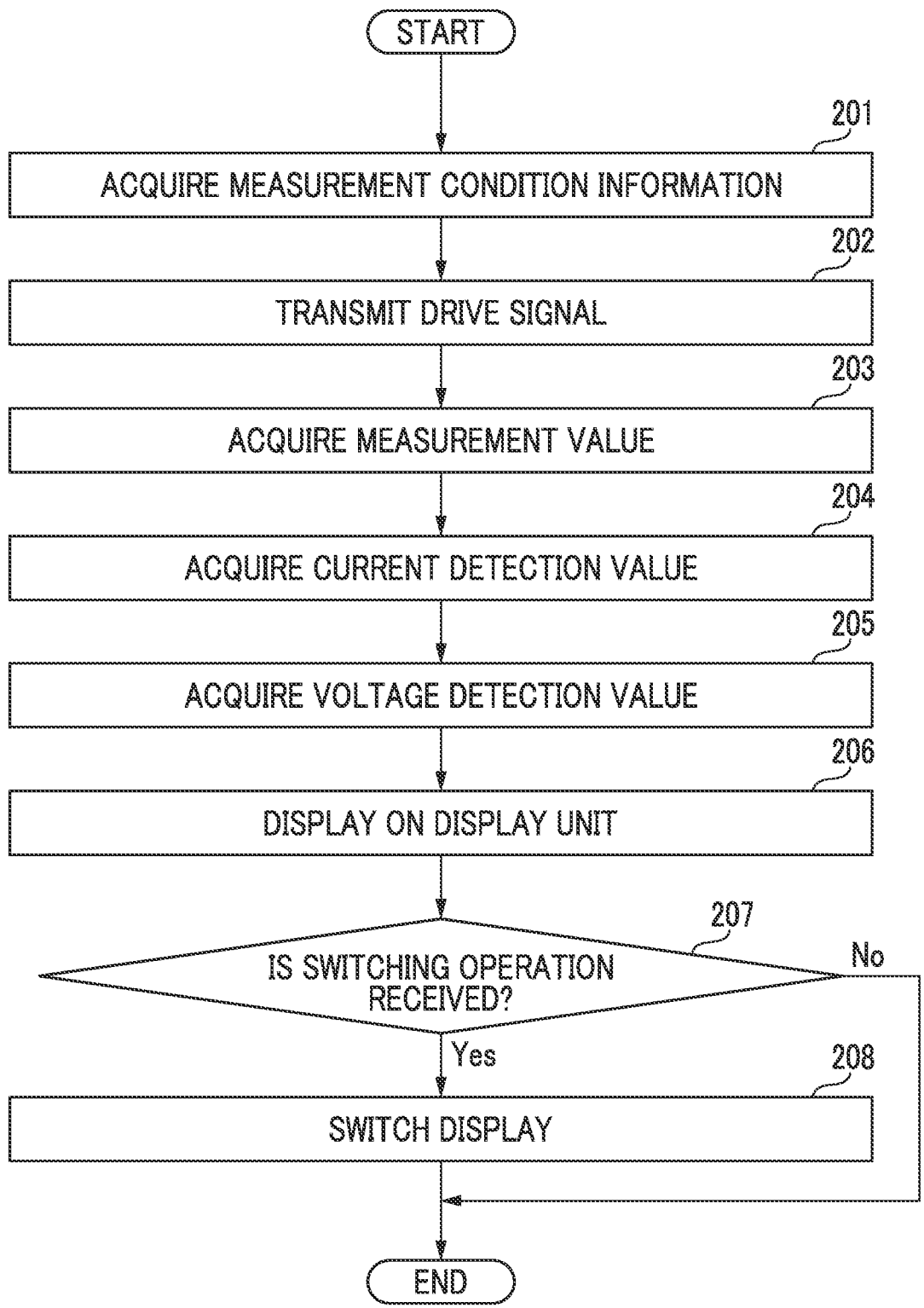
FIG. 9 is a diagram (flowchart) for describing an electrophoresis analysis method according to the embodiment.

Next, with reference to FIG. 9, an electrophoresis analysis method using the electrophoresis system 100 according to the present embodiment will be described. It should be noted that control processes in steps 201 to 208 are performed by executing the electrophoresis analysis program 53a stored in the storage unit 53 by the control unit 54 (analysis device 102).

First, in step 201, the measurement condition information for performing the measurement is acquired. Specifically, the well information 52b indicating the wells 70a and 71a in which the measurement targets to be measured are disposed, the schedule information 52c indicating the measurement order, the information indicating the types of the measurement targets disposed in the wells 70a and 71a, and the like are acquired (set) together with the measurement condition information including the information indicating the magnitude and the time of the voltage applied by the voltage application unit 20. It should be noted that these information may be acquired based on the input operation to the operation unit 51, or may be acquired from the information stored in advance in the storage unit 53 or the like.

Next, in step 202, the drive signal including the acquired measurement condition information is transmitted to the control unit 40 of the electrophoresis device 101. The drive signal includes the acquired well information 52b, schedule information 52c, and the like, in addition to the measurement condition information. Based on this drive signal, in the electrophoresis device 101, the analysis (measurement) by the electrophoresis using the chips 60a to 60c is performed for each measurement target of the predetermined wells 70a and 71a in a setting order.

Next, in step 203, the measurement value 111 is acquired based on the measurement by the measurement unit 30 of the electrophoresis device 101. The measurement value 111 is sequentially acquired in real time as the measurement progresses. Specifically, the measurement target disposed in any of the wells 70a and 71a corresponding to the preset measurement order is supplied to any of the chips 60a to 60c, and the application of the voltage by the voltage application unit 20 is started. As a result, in any of the chips 60a to 60c, the measurement value 111 measured by the measurement unit 30 is acquired in real time from a point in time when the introduction of the measurement target into the preparation flow path 63 is started.

In step 204, the current detection value 112 of the current flowing through the flow path 61 by the voltage applied by the voltage application unit 20 of the electrophoresis device 101 is acquired. Specifically, the four current detection values 112 of the current flowing through the electrodes 65a to 65d, respectively, are acquired in real time in synchronization with the measurement value 111 by the detection by the current detection unit 21.

In step 205, the voltage detection value 113 of the voltage applied to the flow path 61 is acquired by the voltage application unit 20 of the electrophoresis device 101. Specifically, the four voltage detection values 113 of the voltage applied to the electrodes 65a to 65d, respectively, are acquired in real time in synchronization with the measurement value 111 by the detection by the voltage detection unit 22. It should be noted that the acquisition of the measurement value 111, the current detection value 112, and the voltage detection value 113 in steps 203 to 205 is performed at substantially the same timing.

Next, in step 206, the time-series value (waveform) of each of the acquired measurement value 111, current detection value 112, and voltage detection value 113 is displayed on the display unit 52. The time-series values of the measurement value 111, the current detection value 112, and the voltage detection value 113 are arranged and displayed as the waveform over the common measurement period from the point in time when the application of the voltage by the voltage application unit 20 is started to the present. It should be noted that the acquisition and the display of the measurement value 111, the current detection value 112, and the voltage detection value 113 in steps 203 to 206 are updated in real time during the introduction of the measurement target into the preparation flow path 63 and during the measurement of the measurement target.

Next, in step 207, it is determined whether or not the switching operation for switching the display is received. In a case in which it is determined that the switching operation is received, the process proceeds to step 208. In addition, in a case in which it is not determined that the switching operation is received, the control process is terminated.

In step 208, based on the received switching operation, displaying the time-series value of each of the measurement value 111, the current detection value 112, and the voltage detection value 113 on the display unit 52 and displaying the well information 52b and the schedule information 52c on the display unit 52 in addition to the time-series value of each of the measurement value 111, the current detection value 112, and the voltage detection value 113 are switched.

The control processes in steps 203 to 208 are performed in one chip 60a (60b or 60c) until the measurement (analysis) with respect to the measurement target disposed in the predetermined well 70a or 71a is completed. Moreover, in a case in which the measurement (analysis) with respect to the measurement target disposed in the predetermined well 70a or 71a is completed, the measurement with respect to a new measurement target disposed in the next well 70a or 71a is performed according to the schedule information 52c. In addition, the measurements in the chips 60a to 60c are simultaneously performed.

Effects of Present Embodiment

In the present embodiment, the following effects can be obtained.

In the electrophoresis system 100 according to the present embodiment, as described above, each of the time-series value of the measurement value 111 and the time-series value of the current detection value 112 is displayed on the display unit 52 during the measurement of the measurement target. Here, in a case in which an abnormality also occurs in the current (current detection value 112) when an abnormality occurs in the measurement value 111, the probability of the abnormality, such as the concentration of the measurement target itself, an abnormality in the power supply part (voltage application unit 20, wiring member, electrodes 65a to 65d, or the like) for passing the current, an abnormality (abnormality of supply unit 10) in a process of filling the flow path 61 with the separation buffer, or the like is considered. On the other hand, in a case in which the abnormality does not occur in the current (current detection value 112) when the abnormality occurs in the measurement value 111, the probability of deterioration of the member (chips 60a to 60c) in which the flow path 61 is formed. Therefore, as described above, each of the time-series value of the measurement value 111 and the time-series value of the current detection value 112 is displayed on the display unit 52 during the measurement of the measurement target, so that it is possible to confirm whether or not the abnormality occurs in each of the measurement value 111 and the current (current detection value 112) by visually recognizing the display unit 52. Therefore, in a case in which the abnormality occurs in the measurement value 111, it is possible to confirm whether or not the abnormality occurs in the current, so that the cause of the abnormality of the measurement value 111 can be narrowed down from the probability of the abnormality, such as the concentration of the measurement target itself, the abnormality in the power supply part (voltage application unit 20, wiring member, electrodes 65*a* to 65*d*, or the like) for passing the current, the abnormality (abnormality of supply unit 10) in the process of filling the flow path 61 with the separation buffer, or the like, and the probability of deterioration of the member (chips 60*a* to 60*c*) in which the flow path 61 is formed. As a result, in a case in which the abnormality occurs in the measurement value 111 measured by the electrophoresis, it is possible to reduce the workload of the operator for determining the cause of the abnormality.

In addition, in the embodiment described above, further effects can be obtained by the following configuration.

That is, in the present embodiment, as described above, the electrophoresis system 100 includes the analysis device 102 that acquires the measurement value 111 and the current detection value 112, and the analysis device 102 (control unit 54) is configured to display the time-series value of each of the measurement value 111 and the current detection value 112 on the display unit 52 while updating the time-series value of each of the measurement value 111 and the current detection value 112 in real time during the measurement of the measurement target. With this configuration, the analysis device 102 displays the time-series value of each of the measurement value 111 and the current detection value 112 on the display unit 52 while updating the time-series value of each of the measurement value 111 and the current detection value 112 in real time, so that the operator can confirm a temporal change between the latest measurement value 111 and current detection value 112 updated in real time by visually recognizing the display unit 52. Therefore, the operator can more easily confirm whether or not the abnormality occurs in the measurement value 111 and the current detection value 112. As a result, it is possible to more easily confirm whether or not the abnormality occurs in the current, so that the workload of the operator for determining the cause of the abnormality in the measurement value 111 can be further reduced.

In addition, in the present embodiment, as described above, the electrophoresis device 101 includes the voltage detection unit 22 that detects the voltage applied to the flow path 61, and the analysis device 102 (control unit 54) is configured to display the time-series value of the voltage detection value 113 of the voltage detected by the voltage detection unit 22 on the display unit 52 in addition to the time-series value of each of the measurement value 111 and the current detection value 112 during the measurement of the measurement target. With this configuration, the operator can confirm the time-series value of the voltage detection value 113 in addition to the time-series values of the measurement value 111 and the current detection value 112 during the measurement. Here, in a case in which the abnormality occurs in the voltage, the probability that the abnormality occurs in the configuration (voltage application unit 20, wiring member, electrodes 65*a* to 65*d*, or the like) for passing the current, not in the measurement target itself and the member (chips 60*a* to 60*c*) in which the flow path 61 is formed, is considered. Therefore, the operator can further narrow down the types of the causes of the abnormality of the measurement value 111 by confirming the voltage detection value 113 in addition to the measurement value 111 and the current detection value 112. As a result, in a case in which the abnormality occurs in the measurement value 111 measured by the electrophoresis, it is possible to further reduce the workload of the operator for determining the cause of the abnormality.

In addition, in the present embodiment, as described above, the analysis device 102 (control unit 54) is configured to display the time-series value of each of the measurement value 111 and the current detection value 112 over the common measurement period on the display unit 52 as the waveform. With this configuration, it is possible to easily compare the timing at which the abnormality occurs in the measurement value 111 with the timing at which the abnormality occurs in the current detection value 112. Therefore, the operator can more intuitively confirm whether or not the abnormality occurs in the current detection value 112 in a case in which the abnormality occurs in the measurement value 111. As a result, it is possible to further reduce the workload of the operator for determining the cause of the abnormality in a case in which the abnormality occurs in the measurement value 111.

In addition, in the present embodiment, as described above, the analysis device 102 (control unit 54) is configured to arrange the time-series value of each of the measurement value 111 and the current detection value 112 and display the time-series value of each of the measurement value 111 and the current detection value 112 on the display unit 52. Here, the measurement value 111 of the electrophoresis is changed such that the value is increased each time each component of the separated measurement target is detected, so that the measurement value 111 is the waveform having a plurality of peaks with the elapse of time. On the other hand, since the current detected in the electrophoresis is a substantially fixed direct current, the time-series value of the current detection value 112 shows a substantially fixed value. Therefore, in a case in which the measurement value 111 and the current detection value 112 having different shapes are superimposed and displayed, it is considered that the visibility of both the measurement value 111 and the current detection value 112 is decreased. On the other hand, in the present embodiment, by arranging the time-series values of the measurement value 111 and the current detection value 112 and displaying the time-series values of the measurement value 111 and the current detection value 112 on the display unit 52, the decrease in the visibility of the measurement value 111 and the current detection value 112 can be suppressed.

In addition, in the present embodiment, as described above, the analysis device 102 (control unit 54) is configured to display the well information 52*b* indicating the plurality of wells 70*a* and 71*a*, which are the plurality of disposition positions at which the measurement targets are disposed, and the schedule information 52*c* indicating the measurement orders of the measurement targets disposed at the plurality of wells 70*a* and 71*a*, respectively, on the display unit 52 in addition to the time-series value of each of the measurement value 111 and the current detection value 112. With this configuration, in addition to the measurement value 111 and the current detection value 112, the well information 52*b* and the schedule information 52*c* are displayed, so that the operator can confirm the information of the measurement target currently being measured. Therefore, in a case in which the abnormality occurs in the measurement value 111, it can be easily confirmed that the abnormality occurs when which of the measurement targets disposed in the wells 70a and 71a is measured.

In addition, in the present embodiment, as described above, the analysis device 102 (control unit 54) is configured to, based on the switching operation received by the operation unit 51 that receives the input operation by the operator, switch displaying the time-series value of each of the measurement value 111 and the current detection value 112 on the display unit 52 and displaying the well information 52b and the schedule information 52c on the display unit 52 in addition to the time-series value of each of the measurement value 111 and the current detection value 112. With this configuration, by operating the operation unit 51, the operator can easily switch displaying the measurement value 111 and the current detection value 112 and displaying the well information 52b and the schedule information 52c in addition to the measurement value 111 and the current detection value 112. In addition, a state in which the well information 52b and the schedule information 52c are displayed in addition to the measurement value 111 and the current detection value 112 is switched to a state in which only the measurement value 111 and the current detection value 112 are displayed, so that the measurement value 111 and the current detection value 112 can be enlarged and displayed. Therefore, it is possible to easily improve the visibility of the measurement value 111 and the current detection value 112 by operating the operation unit 51.

In addition, in the present embodiment, as described above, the current detection unit 21 detects the current flowing through each of the plurality of electrodes 65a to 65d disposed in the flow path 61, and the analysis device 102 (control unit 54) is configured to superimpose the time-series values of the plurality of (four) current detection values 112 corresponding to the currents flowing through the plurality of (four) electrodes 65a to 65d, respectively, and display the superimposed time-series values on the display unit 52 in a distinguishable state by different colors. With this configuration, it is possible for the operator to easily visually distinguish and confirm the current flowing through each of the plurality of (four) electrodes 65a to 65d. Therefore, it is possible for the operator to distinguish and confirm the current detection value 112 of the detected current in more detail.

In addition, in the present embodiment, as described above, the flow path 61 includes the preparation flow path 63 for guiding the measurement target to the separation flow path 62, the current detection unit 21 detects the current flowing through each of the plurality of electrodes 65a to 65d which are respectively disposed at both ends (reservoir portions 64c and 64d) of the separation flow path 62 and both ends (reservoir portions 64a and 64b) of the preparation flow path 63, and the analysis device 102 (control unit 54) is configured to display the time-series value of each of the plurality of (four) current detection values 112 corresponding to the currents flowing through the plurality of electrodes 65a to 65d, respectively, and the time-series value of the measurement value 111 on the display unit 52 during the measurement of the measurement target and during introduction of the measurement target into the preparation flow path 63. With this configuration, even in a case in which the abnormality occurs during the introduction of the measurement target into the preparation flow path 63 in addition to during the measurement of the measurement target being separated by the electrophoresis, the current detection value 112 can be confirmed. Therefore, in a case in which the abnormality occurs in the measurement value 111, the operator can confirm whether or not the abnormality occurs in a preparation stage for the measurement.

In addition, in the present embodiment, as described above, the measurement unit 30 measures the measurement target separated by the electrophoresis in the flow path 61 of each of the plurality of chips 60a to 60c (flow path members) provided with the flow path 61 inside, the current detection unit 21 detects the current flowing through the flow path 61 of each of the plurality of chips 60a to 60c, and the analysis device 102 (control unit 54) is configured to display the time-series value of each of the measurement value 111 and the current detection value 112 on the display unit 52 for each of the plurality of chips 60a to 60c. With this configuration, it is possible for the operator to easily visually distinguish and confirm whether or not the abnormality occurs in each flow path 61 even in a case in which the measurements are simultaneously performed in the flow paths 61 of the plurality of chips 60a to 60c.

Effects of Electrophoresis Analysis Method and Electrophoresis Analysis Program According to Present Embodiment In the electrophoresis analysis method and the electrophoresis analysis program 53a according to the present embodiment, the following effects can be obtained.

In the electrophoresis analysis method and the electrophoresis analysis program 53a according to the present embodiment, by the configuration as described above, each of the time-series value of the measurement value 111 and the time-series value of the current detection value 112 is displayed on the display unit 52 during the measurement of the measurement target. Here, in a case in which the abnormality also occurs in the current (current detection value 112) when the abnormality occurs in the measurement value 111, the probability of the abnormality, such as the concentration of the measurement target itself, the abnormality in the power supply part (voltage application unit 20, wiring member, electrodes 65a to 65d, or the like) for passing the current, the abnormality (abnormality of supply unit 10) in the process of filling the flow path 61 with the separation buffer, or the like is considered. On the other hand, in a case in which the abnormality does not occur in the current (current detection value 112) when the abnormality occurs in the measurement value 111, the probability of deterioration of the member (chips 60a to 60c) in which the flow path 61 is formed. Therefore, as described above, each of the time-series value of the measurement value 111 and the time-series value of the current detection value 112 is displayed on the display unit 52 during the measurement of the measurement target, so that it is possible to confirm whether or not the abnormality occurs in each of the measurement value 111 and the current (current detection value 112) by visually recognizing the display unit 52. Therefore, in a case in which the abnormality occurs in the measurement value 111, it is possible to confirm whether or not the abnormality occurs in the current, so that the cause of the abnormality of the measurement value 111 can be narrowed down from the probability of the abnormality, such as the concentration of the measurement target itself, the abnormality in the power supply part (voltage application unit 20, wiring member, electrodes 65a to 65d, or the like) for passing the current, the abnormality (abnormality of supply unit 10) in the process of filling the flow path 61 with the separation buffer, or the like, and the probability of deterioration of the member (chips 60a to 60c) in which the flow path 61 is formed. As a result, in a case in which the abnormality occurs in the measurement value 111 measured by the electrophoresis, the electrophoresis analysis method and the electrophoresis analysis program 53a that can reduce the workload of the operator for determining the cause of the abnormality can be provided.

Modification Example

It should be noted that the embodiment disclosed this time is an exemplary example in all respects and is not considered to be restrictive. The scope of the present invention is shown by the scope of claims, not the description of the above embodiment, and further includes all changes (modification examples) within the meaning and the scope equivalent to the scope of claims.

For example, in the embodiment described above, the example has been shown in which the electrophoresis device 101 that performs the measurement by the electrophoresis and the analysis device 102 that displays the measurement value 111, the current detection value 112, and the voltage detection value 113 are separately provided, but the present invention is not limited to this. For example, the electrophoresis device 101 that performs the measurement by the electrophoresis may be configured to display the measurement value 111, the current detection value 112, and the voltage detection value 113. In addition, a display device (display unit) that displays the measurement value 111, the current detection value 112, and the voltage detection value 113 may be provided separately from the electrophoresis device 101 and the analysis device 102.

In addition, in the embodiment described above, the example has been shown in which the three time-series values of the measurement value 111, the current detection value 112, and the voltage detection value 113 are displayed on the display unit 52 is shown, but the present invention is not limited to this. For example, instead of displaying the time-series value of the voltage detection value 113, the two time-series values of the measurement value 111 and the current detection value 112 may be displayed.

In addition, in the embodiment described above, the example has been shown in which the time-series value of each of the measurement value 111, the current detection value 112, and the voltage detection value 113 over the common measurement period from the point in time when the application of the voltage by the voltage application unit 20 is started are displayed on the display unit 52, but the present invention is not limited to this. For example, the time-series value of the measurement value 111 from a point in time (point in time T1 of FIGS. 5 and 6) when the electrophoresis in the separation flow path 62 is started may be displayed while displaying the time-series values of the current detection value 112 and the voltage detection value 113 from the point in time when the application of the voltage by the voltage application unit 20 is started. In addition, the time-series value of each of the measurement value 111, the current detection value 112, and the voltage detection value 113 over the common measurement period during the measurement of the measurement target (from the point in time when the electrophoresis in the separation flow path 62 is started) may be displayed. In addition, each of the measurement value 111, the current detection value 112, and the voltage detection value 113 may be displayed to indicate the time-series values in different periods from each other.

In addition, in the embodiment described above, the example has been shown in which the time-series values of the measurement value 111, the current detection value 112, and the voltage detection value 113 are arranged side by side (left and right) and displayed, but the present invention is not limited to this. For example, the time-series values of the measurement value 111, the current detection value 112, and the voltage detection value 113 may be arranged vertically (one above the other) and displayed. In addition, the time-series values of the measurement value 111, the current detection value 112, and the voltage detection value 113 may be superimposed and displayed. In that case, it is preferable that only the time-series values of the current detection value 112 and the voltage detection value 113 be superimposed and displayed.

In addition, in the embodiment described above, the example has been shown in which the well information 52b and the schedule information 52c are displayed in addition to the time-series value of each of the measurement value 111, the current detection value 112, and the voltage detection value 113, but the present invention is not limited to this. For example, any of the well information 52b and the schedule information 52c may be displayed together with the time-series value of each of the measurement value 111, the current detection value 112, and the voltage detection value 113.

In addition, in the embodiment described above, the example has been shown in which the display is switched based on the switching operation received by the operation unit 51, but the present invention is not limited to this. For example, the display may not be switched in a state in which the well information 52b and the schedule information 52c are displayed in addition to the time-series value of each of the measurement value 111, the current detection value 112, and the voltage detection value 113. In addition, the display may be switched to erase any one of the well information 52b and the schedule information 52c.

In addition, in the embodiment described above, the example has been shown in which the time-series values of the four current detection values 112 of the currents flowing through the plurality of electrodes 65a to 65d, respectively, are displayed, but the present invention is not limited to this. For example, the time-series value of the current detection value 112 of one of the currents flowing through the plurality of electrodes 65a to 65d, respectively, may be displayed. In addition, the two current detection values 112 may be displayed to show the current of the separation flow path 62 and the current of the preparation flow path 63 one by one. Similarly, the voltage detection value 113 may display one voltage detection value 113 or two voltage detection values 113 instead of four.

In addition, in the embodiment described above, the example has been shown in which the chips 60a to 60c (flow path members) are provided with the preparation flow path 63 for guiding the measurement target to the separation flow path 62, but the present invention is not limited to this. For example, a configuration may be adopted in which the chips 60a to 60c (flow path members) include only the separation flow path 62 without including the preparation flow path 63. In addition, a configuration may be adopted in which the preparation flow path 63 intersects the separation flow path 62 to form a T shape, instead of a shape (cross shape) in which the separation flow path 62 and the preparation flow path 63 intersect to penetrate each other.

In addition, in the embodiment described above, the example has been shown in which the electrophoresis device 101 is configured to measure each of the plurality of (three) chips 60a to 60c (flow path members), but the present invention is not limited to this. For example, the measurements of one or two chips (flow path members) may be performed, or the measurements of four or more chips may be performed. In addition, even in a case in which the electrophoresis device 101 is configured to measure each of the three chips 60a to 60c (flow path members), a configuration may be adopted in which only one or two chips are designated (selected) and measured.

In addition, in the embodiment described above, the example has been shown in which the electrophoresis device 101 is configured to perform the microchip electrophoresis, but the present invention is not limited to this. For example, a configuration may be adopted in which capillary electrophoresis is performed without using the microchip.

In addition, in the embodiment described above, the example has been shown in which the degree of separation (degree of movement) of the measurement target is measured by the fluorescence detection, but the present invention is not limited to this. For example, the separated components of the measurement target may be detected by coloring with a reagent.

Aspects

It will be understood by those skilled in the art that the exemplary embodiment described above is a specific example of the following aspects.

Item 1

An electrophoresis system including:
an electrophoresis device including
a measurement unit that measures a measurement target separated by electrophoresis in a flow path including a separation flow path for separating the measurement target, and
a current detection unit that detects a current flowing through the flow path,
in which the electrophoresis system is configured to display each of a time-series value of a measurement value of the measurement target measured by the measurement unit and a time-series value of a current detection value of the current detected by the current detection unit on a display unit during measurement of the measurement target.

Item 2

The electrophoresis system according to item 1, further including:
an analysis device that acquires the measurement value and the current detection value,
in which the analysis device is configured to display the time-series value of each of the measurement value and the current detection value on the display unit while updating the time-series value of each of the measurement value and the current detection value in real time during the measurement of the measurement target.

Item 3

The electrophoresis system according to item 1 or 2,
in which the electrophoresis device further includes a voltage detection unit that detects a voltage applied to the flow path, and
the electrophoresis system is configured to display a time-series value of a voltage detection value of the voltage detected by the voltage detection unit in addition to the time-series value of each of the measurement value and the current detection value on the display unit during the measurement of the measurement target.

Item 4

The electrophoresis system according to any one of items 1 to 3,
in which the electrophoresis system is configured to display the time-series value of each of the measurement value and the current detection value over a common measurement period on the display unit as a waveform.

Item 5

The electrophoresis system according to any one of items 1 to 4,
in which the electrophoresis system is configured to arrange the time-series values of the measurement value and the current detection value and display the arranged time-series values on the display unit.

Item 6

The electrophoresis system according to any one of items 1 to 5,
in which the electrophoresis system is configured to display well information indicating a plurality of wells which are a plurality of disposition positions at which the measurement target is disposed, and schedule information indicating measurement orders of the measurement targets disposed at the plurality of wells, respectively, on the display unit in addition to the time-series value of each of the measurement value and the current detection value.

Item 7

The electrophoresis system according to item 6,
in which the electrophoresis system is configured to, based on a switching operation received by an operation unit that receives an input operation by an operator, switch displaying the time-series value of each of the measurement value and the current detection value on the display unit and displaying the well information and the schedule information on the display unit in addition to the time-series value of each of the measurement value and the current detection value.

Item 8

The electrophoresis system according to any one of items 1 to 7,
in which the current detection unit detects a current flowing through each of a plurality of electrodes disposed in the flow path, and
the electrophoresis system is configured to superimpose time-series values of a plurality of the current detection values corresponding to the currents flowing through the plurality of electrodes, respectively, and display the superimposed time-series values on the display unit in a distinguishable state by different colors.

Item 9

The electrophoresis system according to any one of items 1 to 8,
in which the flow path further includes a preparation flow path for guiding the measurement target to the separation flow path,
the current detection unit detects a current flowing through each of a plurality of electrodes which are respectively disposed at both ends of the separation flow path and both ends of the preparation flow path, and
the electrophoresis system is configured to display a time-series value of each of a plurality of the current detection values corresponding to the currents flowing through the plurality of electrodes, respectively, and the time-series value of the measurement value on the display unit during the measurement of the measurement target and during introduction of the measurement target into the preparation flow path.

Item 10

The electrophoresis system according to any one of items 1 to 9, in which the measurement unit measures the measurement target separated by the electrophoresis in the flow path of each of a plurality of flow path members provided with the flow path inside, the current detection unit detects the current flowing through the flow path of each of the plurality of flow path members, and the electrophoresis system is configured to display the time-series value of each of the measurement value and the current detection value on the display unit for each of the plurality of flow path members.

Item 11

An electrophoresis analysis method including:

a step of acquiring a measurement value obtained by measuring a measurement target separated by electrophoresis in a flow path including a separation flow path for separating the measurement target;

a step of acquiring a current detection value of a current flowing through the flow path; and a step of displaying each of a time-series value of the measurement value and a time-series value of the current detection value on a display unit during measurement of the measurement target.

Item 12

An electrophoresis analysis program causing a computer to execute:

a step of acquiring a measurement value obtained by measuring a measurement target separated by electrophoresis in a flow path including a separation flow path for separating the measurement target;

a step of acquiring a current detection value of a current flowing through the flow path; and a step of displaying each of a time-series value of the measurement value and a time-series value of the current detection value on a display unit during measurement of the measurement target.

What is claimed is:

1. An electrophoresis system comprising:
an electrophoresis device including
a measurement unit that measures a measurement target separated by electrophoresis in a flow path including a separation flow path for separating the measurement target, and
a current detection unit that detects a current flowing through the flow path,
wherein the electrophoresis system is configured to display each of a time-series value of a measurement value of the measurement target measured by the measurement unit and a time-series value of a current detection value of the current detected by the current detection unit on a display unit during measurement of the measurement target, and
wherein the electrophoresis system is configured to display well information indicating a plurality of wells which are a plurality of disposition positions at which the measurement target is disposed on the display unit in addition to the time-series value of each of the measurement value and the current detection value.

2. The electrophoresis system according to claim 1, further comprising:
an analysis device that acquires the measurement value and the current detection value,
wherein the analysis device is configured to display the time-series value of each of the measurement value and the current detection value on the display unit while updating the time-series value of each of the measurement value and the current detection value in real time during the measurement of the measurement target.

3. The electrophoresis system according to claim 1,
wherein the electrophoresis device further includes a voltage detection unit that detects a voltage applied to the flow path, and
the electrophoresis system is configured to display a time-series value of a voltage detection value of the voltage detected by the voltage detection unit in addition to the time-series value of each of the measurement value and the current detection value on the display unit during the measurement of the measurement target.

4. The electrophoresis system according to claim 1,
wherein the electrophoresis system is configured to display the time-series value of each of the measurement value and the current detection value over a common measurement period on the display unit as a waveform.

5. The electrophoresis system according to claim 1,
wherein the electrophoresis system is configured to arrange the time-series values of the measurement value and the current detection value and display the arranged time-series values on the display unit.

6. The electrophoresis system according to claim 1,
wherein the electrophoresis system is configured to display the well information indicating the plurality of wells which are the plurality of disposition positions at which the measurement target is disposed, and schedule information indicating measurement orders of the measurement targets disposed at the plurality of wells, respectively, on the display unit in addition to the time-series value of each of the measurement value and the current detection value.

7. The electrophoresis system according to claim 6,
wherein the electrophoresis system is configured to, based on a switching operation received by an operation unit that receives an input operation by an operator, switch displaying the time-series value of each of the measurement value and the current detection value on the display unit and displaying the well information and the schedule information on the display unit in addition to the time-series value of each of the measurement value and the current detection value.

8. The electrophoresis system according to claim 1,
wherein the current detection unit is configured to detect a current flowing through each of a plurality of electrodes disposed in the flow path, and
the electrophoresis system is configured to superimpose time-series values of a plurality of the current detection values corresponding to the currents flowing through the plurality of electrodes, respectively, and display the superimposed time-series values on the display unit in a distinguishable state by different colors.

9. The electrophoresis system according to claim 1,
wherein the flow path further includes a preparation flow path for guiding the measurement target to the separation flow path,
the current detection unit detects a current flowing through each of a plurality of electrodes which are respectively disposed at both ends of the separation flow path and both ends of the preparation flow path, and
the electrophoresis system is configured to display a time-series value of each of a plurality of the current detection values corresponding to the currents flowing through the plurality of electrodes, respectively, and the time-series value of the measurement value on the display unit during the measurement of the measurement target and during introduction of the measurement target into the preparation flow path.

10. The electrophoresis system according to claim 1, wherein the measurement unit measures the measurement target separated by the electrophoresis in the flow path of each of a plurality of flow path members provided with the flow path inside, the current detection unit detects the current flowing through the flow path of each of the plurality of flow path members, and the electrophoresis system is configured to display the time-series value of each of the measurement value and the current detection value on the display unit for each of the plurality of flow path members.

11. An electrophoresis analysis method comprising:

a step of acquiring a measurement value obtained by measuring a measurement target separated by electrophoresis in a flow path including a separation flow path for separating the measurement target;

a step of acquiring a current detection value of a current flowing through the flow path; and a step of displaying each of a time-series value of the measurement value and a time-series value of the current detection value on a display unit during measurement of the measurement target, wherein the step of displaying each of the time-series value of the measurement value and the current detection value includes displaying well information indicating a plurality of wells which are a plurality of disposition positions at which the measurement target is disposed on the display unit in addition to the time-series value of each of the measurement value and the current detection value.

* * * * *